United States Patent
Popli et al.

(10) Patent No.: US 11,196,836 B2
(45) Date of Patent: Dec. 7, 2021

(54) PERSISTING USER CONFIGURATION SETTINGS ON WRITE FILTER ENABLED DEVICES

(71) Applicant: Dell Products L.P., Round Rock, TX (US)

(72) Inventors: Sumit Popli, Campbell, CA (US); Suruchi Dubey, Fremont, CA (US); Ryan Mason, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/408,831

(22) Filed: May 10, 2019

(65) Prior Publication Data

US 2020/0358874 A1 Nov. 12, 2020

(51) Int. Cl.
*H04L 29/08* (2006.01)
*G06F 3/06* (2006.01)

(52) U.S. Cl.
CPC .......... *H04L 67/306* (2013.01); *G06F 3/0605* (2013.01); *G06F 3/067* (2013.01); *G06F 3/0622* (2013.01); *G06F 3/0629* (2013.01); *H04L 67/34* (2013.01)

(58) Field of Classification Search
CPC ..... H04L 67/306; H04L 67/34; G06F 3/0629; G06F 3/067; G06F 3/0622; G06F 3/0605
See application file for complete search history.

(56) References Cited

U.S. PATENT DOCUMENTS

| | | | | |
|---|---|---|---|---|
| 7,640,325 B1* | 12/2009 | DeKoning | ............ | G06F 3/0605 709/201 |
| 9,785,478 B1* | 10/2017 | Babu B R | ............... | H04L 67/10 |
| 2012/0198217 A1* | 8/2012 | Tukol | .................. | G06F 9/44505 713/1 |
| 2012/0198223 A1* | 8/2012 | Tukol | .................... | G06F 9/4411 713/2 |
| 2013/0138718 A1* | 5/2013 | Mallur | ................ | H04L 41/0803 709/203 |
| 2015/0072776 A1* | 3/2015 | Nicely | ................ | G07F 17/3225 463/29 |
| 2016/0173331 A1* | 6/2016 | Janke | .................. | H04L 67/2823 709/221 |

* cited by examiner

*Primary Examiner* — Uzma Alam
(74) *Attorney, Agent, or Firm* — Kirton McConkie; Brian Tucker

(57) ABSTRACT

An agent can be employed on write filter enabled devices to retrieve a default configuration from a server when a user logs in. The default configuration can define which user configuration settings are persist-able. After the user has customized user configuration settings, the agent can identify customizations to any persist-able user configuration setting and create a delta configuration to define these customizations. The agent can send the delta configuration to a server so that it will be available when the user logs in to any other write filter enabled device. At any subsequent login, the agent can retrieve the delta configuration and use it to customize the user configuration settings. In this way, a set of customized user configurations settings can be persisted and applied on any write filter enabled device that a user may log in to.

20 Claims, 14 Drawing Sheets

500

501

In Conjunction With A User Logging In To A First Write Filter Enabled Device, Receive, By An Agent Executing On The First Write Filter Enabled Device, A Default Configuration That Identifies One Or More User Configuration Settings Available On The First Write Filter Enabled Device

502

Determine, By The Agent, That The User Has Customized At Least One Of The One Or More User Configuration Settings

503

Create, By The Agent, A Delta Configuration That Identifies Each Customized User Configuration Setting

504

Send, By The Agent, The Delta Configuration To A Server

*FIG. 5*

PERSISTING USER CONFIGURATION SETTINGS ON WRITE FILTER ENABLED DEVICES

CROSS-REFERENCE TO RELATED APPLICATIONS

N/A

BACKGROUND

The Windows Embedded and Windows operating systems include functionality that can prevent the content of a storage medium from being changed. In a typical example, it may be desirable to prevent the operating system image, which may be stored on a particular disk partition or on flash media, from being changed at runtime. To accomplish this, Windows provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

FIG. 1 illustrates how a write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

Although FIG. 1 represents a write filter in a Windows environment, write filters are implemented and used in other operating systems, including Linux, in much the same way. Therefore, in this specification and the claims, the term "write filter enabled device" should be construed as any computing device, regardless of its operating system, that implements a write filter to protect a volume from modification. The term "volume" should be construed as any storage container that has been formatted with a file system. The term "protected volume" should be construed as a volume, whether physical or virtual, that a write filter protects.

As indicated above, when using a write filter enabled device, the user can typically make changes to customize the operating system, applications, or other types of software. For example, unless a policy prevents it, a user should be able to set a desktop background, define the buttons of the mouse (e.g., to set it as a right-handed or left-handed mouse), set the keyboard language, turn on a virtual keyboard, define shortcut keys, change display settings (e.g., the size of icons and text, the appearance of the cursor or the brightness), turn on a magnifier, narrator, closed captioning or other accessibility (or ease of access) feature, etc. However, even though the user can make such customizations, the write filter will cause these customizations to be saved in the overlay. As a result, the customizations will be discarded at reboot thereby requiring the user to make the same customizations each time he or she logs in to the write filter enabled device.

To address this issue, an administrator could cause the user's customizations to be persisted to the protected volume (e.g., by disabling the write filter while the user's customizations are made). In such a case, the customizations would be persisted across reboots since they are stored on the protected volume rather than in the overlay. Although this approach would retain the user's customizations, it places a significant burden on the administrator. Furthermore, this approach would only be suitable if the user employs the same write filter enabled device each time he or she logs in.

Increasingly more companies are implementing a free seating environment in which employees are not assigned a desk or computing device, but are free to sit wherever they choose including using whatever write filter enabled device may be available. In such an environment, persisting customizations to the protected volume makes little sense since a different user may use a particular write filter enabled device each day. For example, if an administrator configures a particular write filter enabled device to provide a left-handed mouse, that device would then be unsuitable for any right-handed user that may desire to use it in the future.

BRIEF SUMMARY

The present invention extends to methods, systems, and computer program products for persisting user configuration settings on write filter enabled devices. An agent can be employed on write filter enabled devices to retrieve a default configuration from a server when a user logs in. The default configuration can define which user configuration settings are persist-able. After the user has customized user configuration settings, the agent can identify customizations to any persist-able user configuration setting and create a delta configuration to define these customizations. The agent can send the delta configuration to a server so that it will be available when the user logs in to any other write filter enabled device. At any subsequent login, the agent can retrieve the delta configuration and use it to customize the user configuration settings. In this way, a set of customized user configurations settings can be persisted and applied on any write filter enabled device that a user may log in to.

In one embodiment, the present invention is implemented by an agent as a method for persisting user configuration settings on write filter enabled devices. In conjunction with a user logging in to a first write filter enabled device, the agent can receive a default configuration that identifies one or more user configuration settings available on the first write filter enabled device. The agent can then determine that the user has customized at least one of the one or more user configuration settings and create a delta configuration that identifies each customized user configuration setting. The agent can send the delta configuration to a server where it will be accessible to any other agent on any other write filter enabled device that the user may employ.

In another embodiment, the present invention is implemented as computer storage media storing computer executable instruction which when executed by one or more processors on a write filter enabled device implement a method for persisting user configuration settings. This method can include: accessing a default configuration that identifies one or more persist-able user configuration settings that are available on each of a plurality of write filter enabled devices; for each of at least one of the one or more persist-able user configuration settings, retrieving a value that a user has defined for the persist-able user configuration setting while the user is logged in to one of the plurality of write filter enabled devices; creating a delta configuration that identifies each of the at least one persist-able user configuration settings and the corresponding value that the user has defined for the persist-able user configuration setting; and sending the delta configuration to a server to thereby cause the delta configuration to be stored and made accessible when the user subsequently logs in to any one of the plurality of write filter enabled devices.

In another embodiment, the present invention is implemented as a method for persisting user configuration settings on write filter enabled devices. In conjunction with a user logging in to a first write filter enabled device, an agent executing on the first write filter enabled device receives a default configuration that identifies one or more persist-able user configuration settings that are available on the first write filter enabled device. In conjunction with the user logging off from the first write filter enabled device, the agent executing on the first write filter enabled device creates a delta configuration that identifies a custom value that the user defined for at least one of the one or more persist-able user configuration settings while the user was logged in to the first write filter enabled device. The agent executing on the first write filter enabled device then sends the delta configuration to a server. In conjunction with the user subsequently logging in to a second write filter enabled device, an agent executing on the second write filter enabled device receives the delta configuration and applies each custom value identified in the delta configuration to customize the second write filter enabled device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 5 provides a flowchart of an example method for persisting user configuration settings on a write filter enabled device.

DETAILED DESCRIPTION

Figure 2:
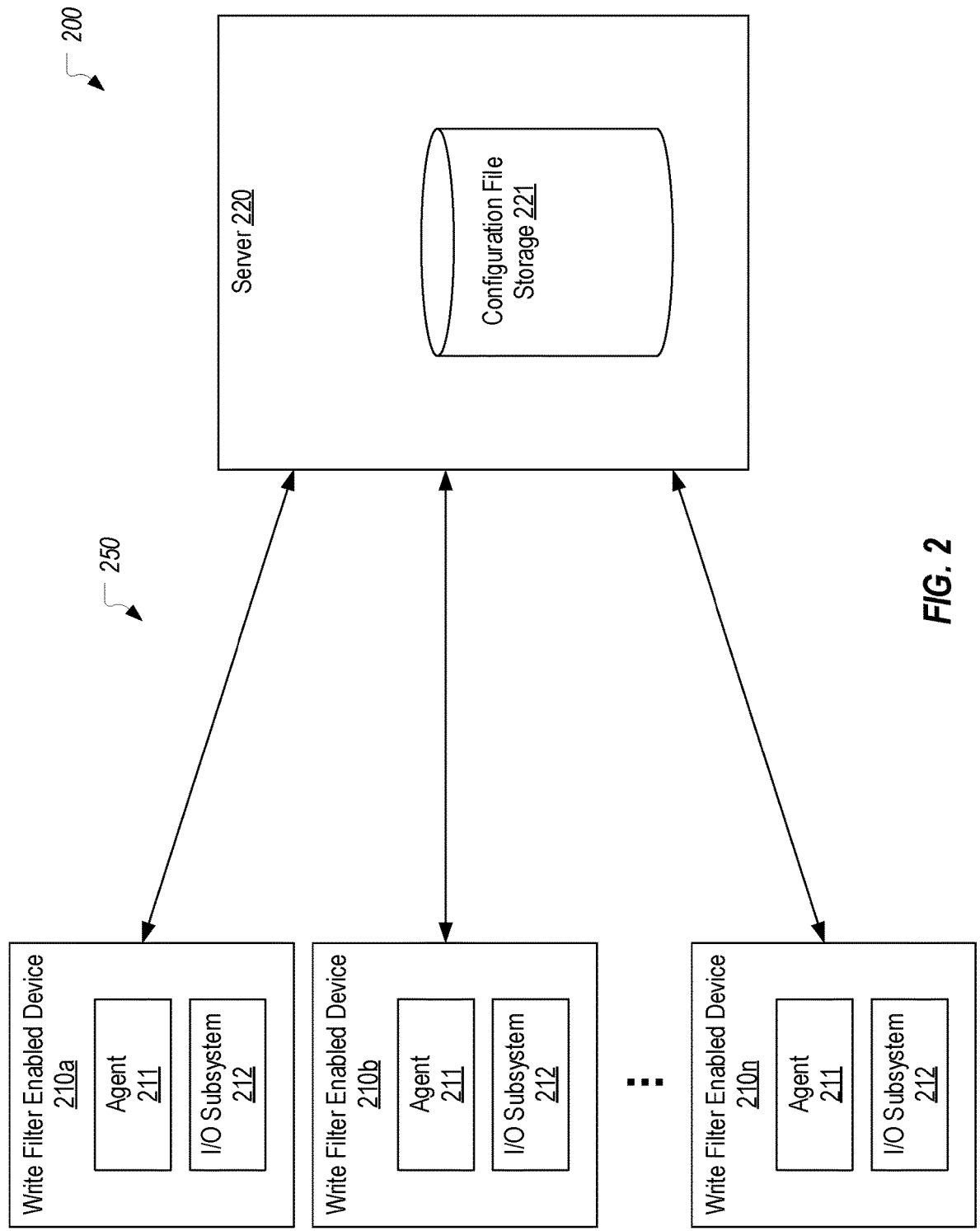
FIG. 2 illustrates an example environment in which the present invention can be implemented.

FIG. 2 illustrates an example environment 200 in which the present invention can be implemented. Environment 200 includes a number of write filter enabled devices 210a-210n (where n represents any integer) and a server 220 which is accessible to each of write filter enabled devices 210a-210n via a network 250. Network 250 can represent any suitable connection including a LAN connection or internet connection. The present invention may be particularly beneficial in free seating environments where a large number of write filter enabled devices are provided for any of the employees to use. Accordingly, environment 200 may oftentimes include hundreds or even thousands of write filter enabled devices.

Figure 1:
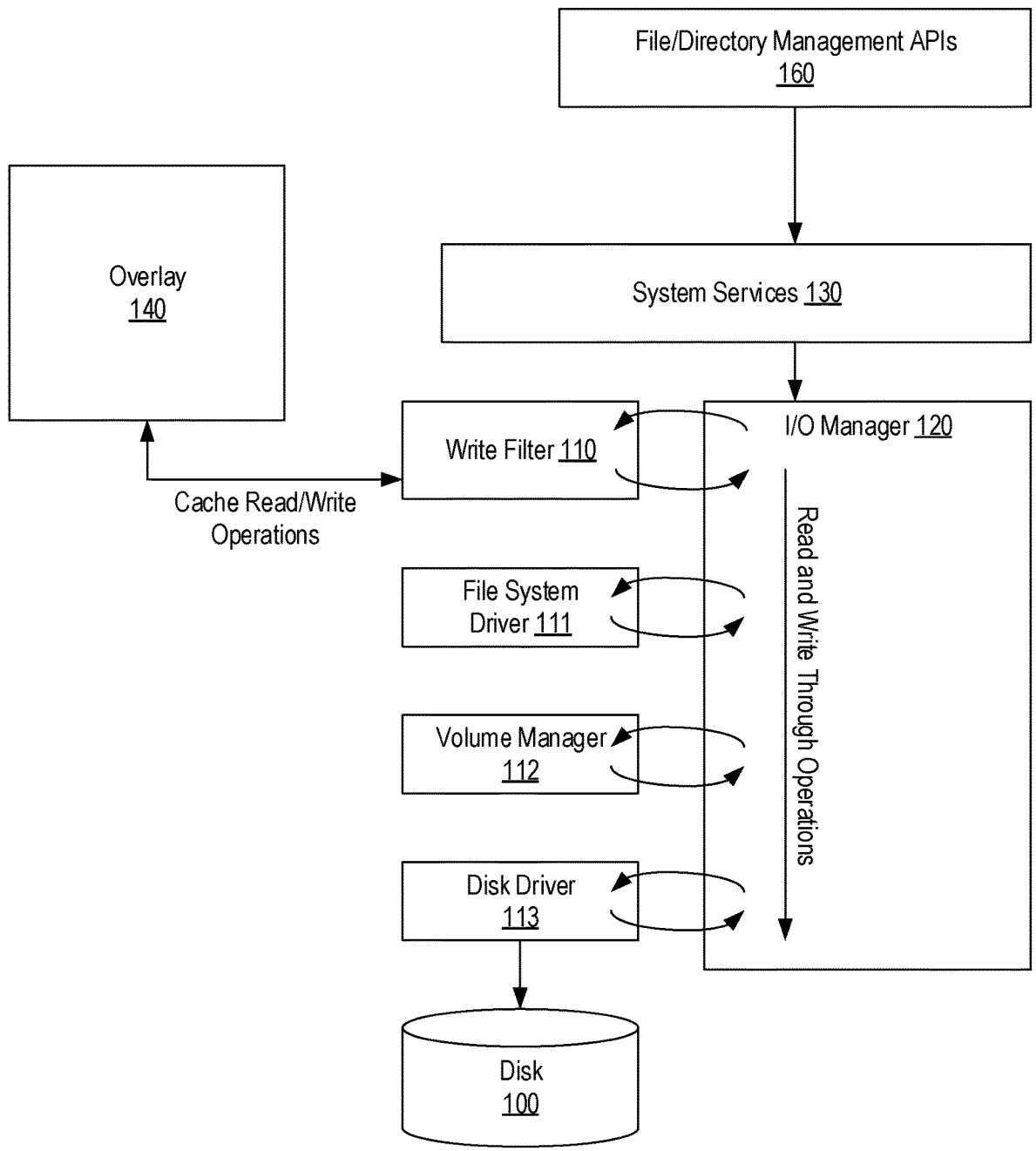
FIG. 1 illustrates an example architecture of a write filter enabled device.

Each of write filter enabled devices 210a-210n (collectively or individually "write filter enabled device(s) 210") includes an agent 211 and I/O subsystem 212. I/O subsystem 212 can represent the Windows I/O subsystem shown in FIG. 1 or any other I/O subsystem that includes a write filter. Agent 211 can be a software component that is installed on write filter enabled device 210 for the purpose of implementing the techniques of the present invention among possibly many other functions. As an example only, agent 211 could be a component of the Wyse Management Suite.

Server 220 can represent any number of physical devices or virtual components that are configured to function as a server for the purpose of implementing the techniques of the present invention. As shown, server 220 maintains a configuration file storage 221 for storing configuration files that are applicable to write filter enabled devices 210. Configuration file storage 221 can represent any type or technique for maintaining files such as a database, an index, a file system, etc. By way of example only, server 220 could be a management server of the Wyse Management Suite.

FIGS. 3A-3E illustrate how agent 211 and server 220 can be configured to enable customizations that a user makes to user configuration settings on one of write filter enabled devices 210 to be persisted so that the customizations can be applied on any of the write filter enabled devices 210 that the user may subsequently use. In the following description and the claims, the term "default configuration" should be construed as a non-user-specific configuration while the term "delta configuration" should be construed as a user-specific configuration.

Figure 3A:
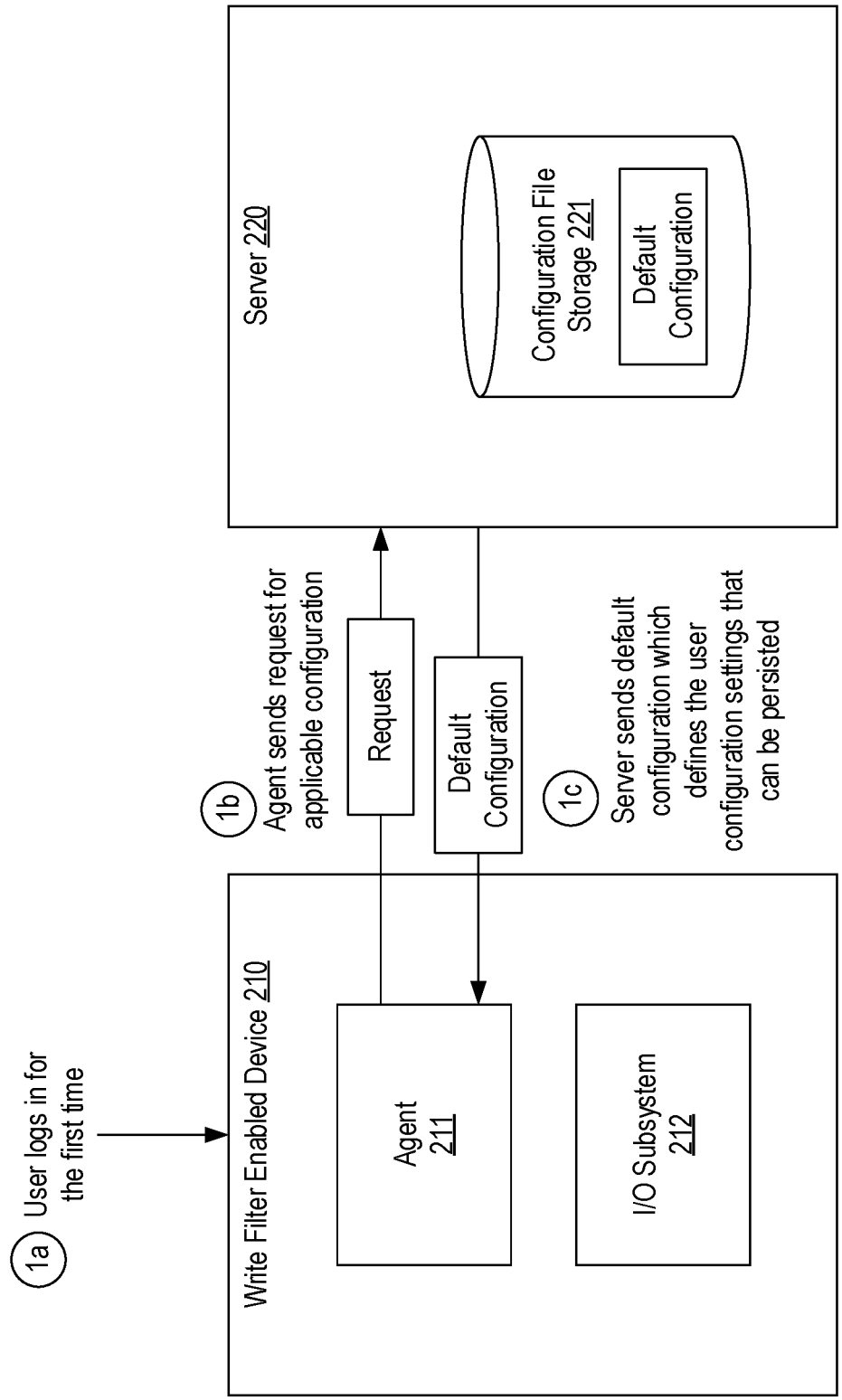
FIGS. 3A-3E illustrate a sequence of steps that can be performed when a user initially logs in to a write filter enabled device to create a delta configuration defining customizations that the user made to user configuration settings while using the write filter enabled device.

In FIG. 3A, it is assumed that the user, in step 1a, logs in to a write filter enabled device 210 for the first time. In this context, a user logging in for the first time can be construed as logging in when server 220 does not yet store a delta configuration for the user. In response to the user logging in, in step 1b, agent 211 can send a request to server 220 to retrieve the configuration that is applicable to the user. This request can include an identification of the user that has logged in (e.g., a username). The applicable configuration could be a default configuration and any delta configuration that has been defined for the user. The applicable configuration could be defined in any suitable format including in one or more files or data structures (e.g., in the form of a JSON file as will be described in detail below).

Since the user is logging in for the first time, server 220 will not yet store a delta configuration for the user and will therefore determine that only a default configuration should be provided. Accordingly, in step 1c, server 220 retrieves the appropriate default configuration from configuration file storage 221 and sends it to agent 211. As will be explained in more detail below, a default configuration primarily defines which user configuration settings can be persisted. This is in contrast to defining any actual customizations to the user configuration settings.

An administrator may create and store a number of different default configurations in configuration file storage 221 and define to which users a particular default configuration is applicable. For example, an administrator may define one default configuration that is applicable to employees in one department and another default configuration that is applicable to employees in another department. Accordingly, step 1c in FIG. 3A can encompass a determination of which configuration (whether default or delta) is applicable to the user that has logged in.

Figure 3B:
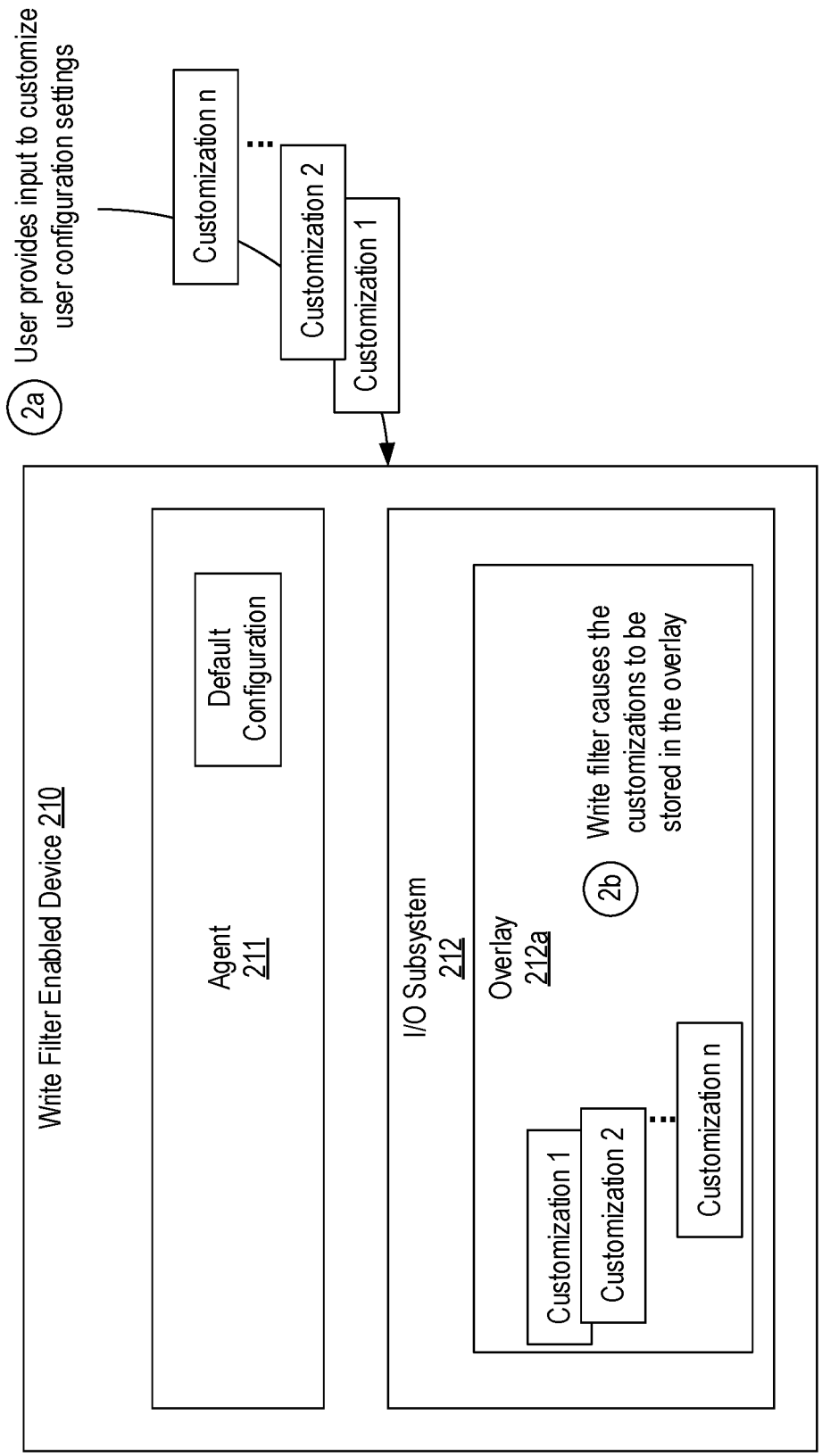

Turning to FIG. 3B, agent 211 is shown as storing the default configuration that it received from server 220 in step 1c. As indicated above, the default configuration primarily defines which user configuration settings can be persisted, and therefore, agent 211 is shown as not yet performing any action based on the contents of the default configuration. However, as will be described below, a default configuration can also provide predefined (i.e., administrator-defined) values for some user configuration settings. In such cases, agent 211 could identify such values and apply them on write filter enabled device 210 in response to receiving the default configuration.

As represented by step 2a in FIG. 3B, it is assumed that the user provides input while using write filter enabled device 210 and that this input defines customizations to various user configuration settings. For example, the user may change the desktop background, network settings, accessibility settings, etc. Such changes may typically be made in a standard manner via the operating system. For example, if write filter enabled device 210 is running a version of the Window operating system, these customizations could be reflected in registry entries, whereas, if write filter enabled device 210 is running a version of the Linux operating system, these customizations could be reflected in .conf files. Regardless of how the customizations are defined, because I/O subsystem 212 includes a write filter, the customizations will be stored in overlay 212a and will therefore not be persisted after write filter enabled device 210 is rebooted.

Figure 3C:
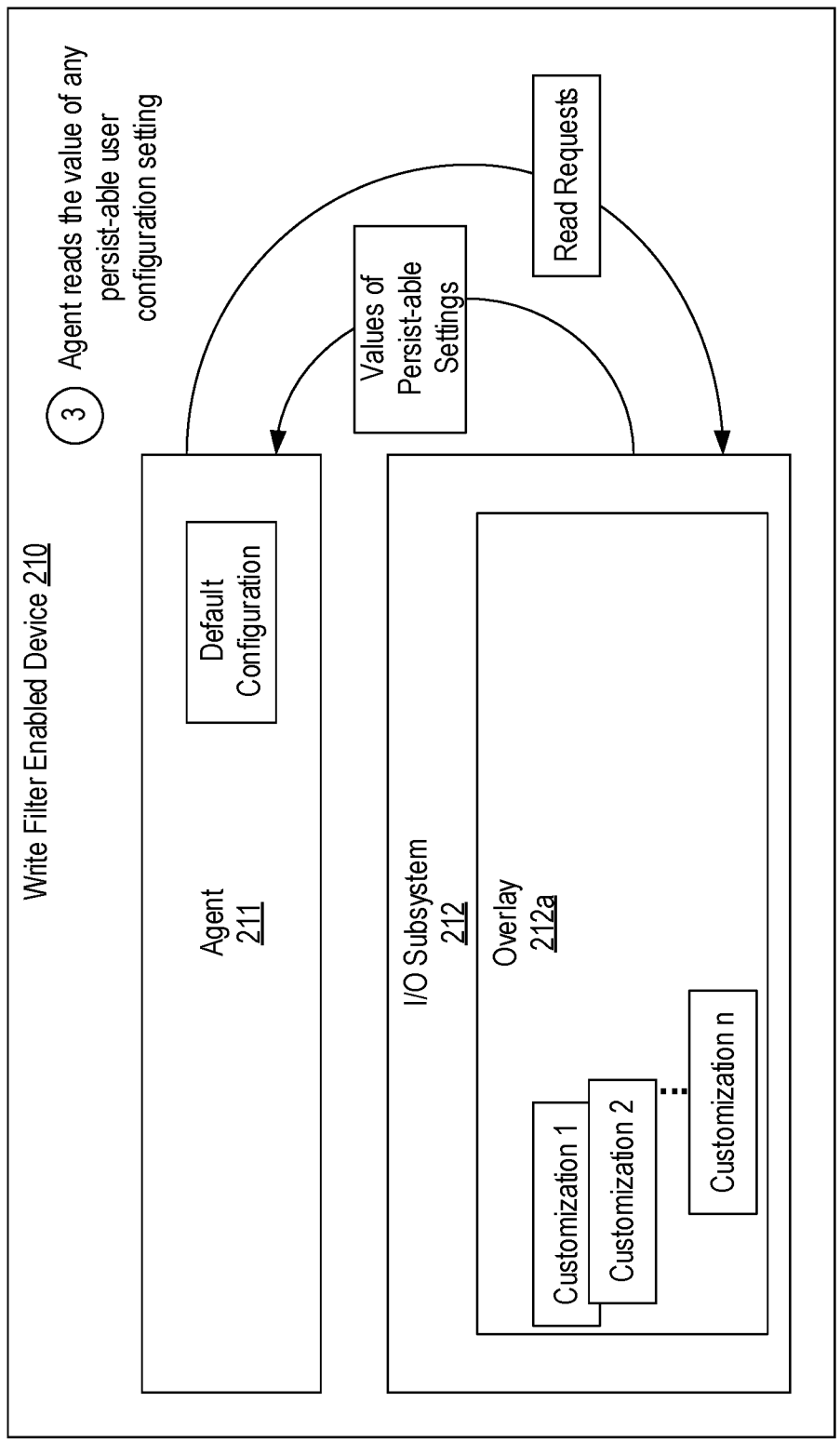

Turning to FIG. 3C, after the user has customized the user configuration settings, in step 3, agent 211 can employ the content of the default configuration to retrieve the customizations that were made to any user configuration setting that the default configuration indicates are persist-able. This can be accomplished by issuing read requests to I/O subsystem 212 to read each persist-able user configuration setting. If the persist-able user configuration setting has been customized, the customized value will be stored in overlay 212a as represented in FIG. 3C. In some embodiments, agent 211 can perform this step as part of the logoff process but could also perform the step at any other time prior to logoff (e.g., on demand, at periodic intervals, etc.).

It is again emphasized that the default configuration defines which user configuration settings are persist-able (i.e., which user configuration settings the administrator will allow the user to persist), and therefore agent 211 will retrieve only the customizations to the user configuration settings that are defined in the default configuration as being persist-able. Accordingly, if the user customizes a user configuration setting that the default configuration indicates is not persist-able, agent 211 will not retrieve the customization as part of step 3.

To better explain how agent 211 can employ a default configuration, the following example is provided where the default configuration is defined in the form of a JSON file.

```
{
  "configurations": {
    "configSettings": [
      {
        "configName": "rcShellsettings",
        "configItems": [
          {
            "itemKey": "showKiosk",
            "itemValue": "Yes",
            "valueType": "BOOL"
          },
          {
            "itemKey": "applicationExitaction",
            "itemValue": "No",
            "valueType": "STRING"
          },
          {
            "itemKey": "smartcardEjectAction",
            "itemValue": "",
            "valueType": "STRING"
          },
          {
            "itemKey": "showAdminmodebutton",
            "itemValue": "Yes",
            "valueType": "BOOL"
          },
          {
            "itemKey": "showSoundicon",
            "itemValue": "No",
            "valueType": "BOOL"
          },
          {
            "itemKey": "showDatetime",
            "itemValue": "Yes",
            "valueType": "BOOL"
          },
          {
            "itemKey": "logo",
            "itemValue": "",
            "valueType": "STRING"
          },
          {
            "itemKey": "desktopImageFile",
            "itemValue": "",
            "valueType": "STRING"
          },
          {
            "itemKey": "showShutdown",
            "itemValue": "No",
            "valueType": "BOOL"
          },
          {
            "itemKey": "showRestart",
            "itemValue": "No",
            "valueType": "BOOL"
          },
          {
            "itemKey": "showLogoff",
            "itemValue": "No",
            "valueType": "BOOL"
          },
          {
```

```
        "itemKey": "showNetwork",
        "itemValue": "Yes",
        "valueType": "BOOL"
    },
    {
        "itemKey": "showVkeyboard",
        "itemValue": "No",
        "valueType": "BOOL"
    },
    {
        "itemKey": "urChangeRegion",
        "itemValue": "No",
        "valueType": "BOOL"
    },
    {
        "itemKey": "urChangeDateTime",
        "itemValue": "No",
        "valueType": "BOOL"
    },
    {
        "itemKey": "urChangeDisplay",
        "itemValue": "No",
        "valueType": "BOOL"
    },
    {
        "itemKey": "urChangeNetwork",
        "itemValue": "Yes",
        "valueType": "BOOL"
    },
    {
        "itemKey": "urChangeMouse",
        "itemValue": "Yes",
        "valueType": "BOOL"
    },
    {
        "itemKey": "urChangeKeyboard",
        "itemValue": "No",
        "valueType": "BOOL"
    },
    {
        "itemKey": "urChangeTouchKeyboard",
        "itemValue": "Yes",
        "valueType": "BOOL"
    },
    {
        "itemKey": "urChangeSound",
        "itemValue": "No",
        "valueType": "BOOL"
    },
    {
        "itemKey": "urChangeEaseofAccess",
        "itemValue": "No",
        "valueType": "BOOL"
    }
    ]
   }
  ]
 }
}
```

In this example, the default configuration includes two different types of entries: a first type of entry that specifies a predefined value for a user configuration setting and a second type of entry that defines a user configuration setting as being persist-able. The first type of entry generally relates to the look and feel of the user's desktop. An administrator can employ such entries to customize the desktop that will be provided to a user or group of users to which the default configuration pertains. The majority of the first type of entries have the prefix "show" and define whether a particular user interface component will be shown on the user's desktop. The first type of entries may also include the "applicationExitaction," "smartcardEjectAction," "logo," and "desktopImageFile" settings. Agent 211 can be configured to apply the predefined values from the first type of entries defined in a default configuration to customize the user's desktop each time the user logs in. For example, in response to receiving this default configuration, agent 211 would cause the kiosk, the admin mode button, the date and time, etc. to be shown/available on the user's desktop, but would not show the sound icon, the shutdown option, the restart option, etc.

In contrast, the second type of entries, which have the "ur" prefix in the example, define whether customizations to the corresponding user configuration settings will be persisted. For example, if the user customizes the network settings while using write filter enabled device 210, agent 211 will retrieve such customizations as part of step 3 since the example default configuration defines a value of Yes for the urChangeNetwork key. In other words, for any entry of the second type that has an "itemValue" set to "Yes," agent 211 will retrieve any customizations that the user has made to the corresponding user configuration setting. Accordingly, an administrator can control which user configuration settings the user will be allowed to persist by simply setting the itemValue of the corresponding entry in the default configuration that is applicable to the user.

Figure 3D:
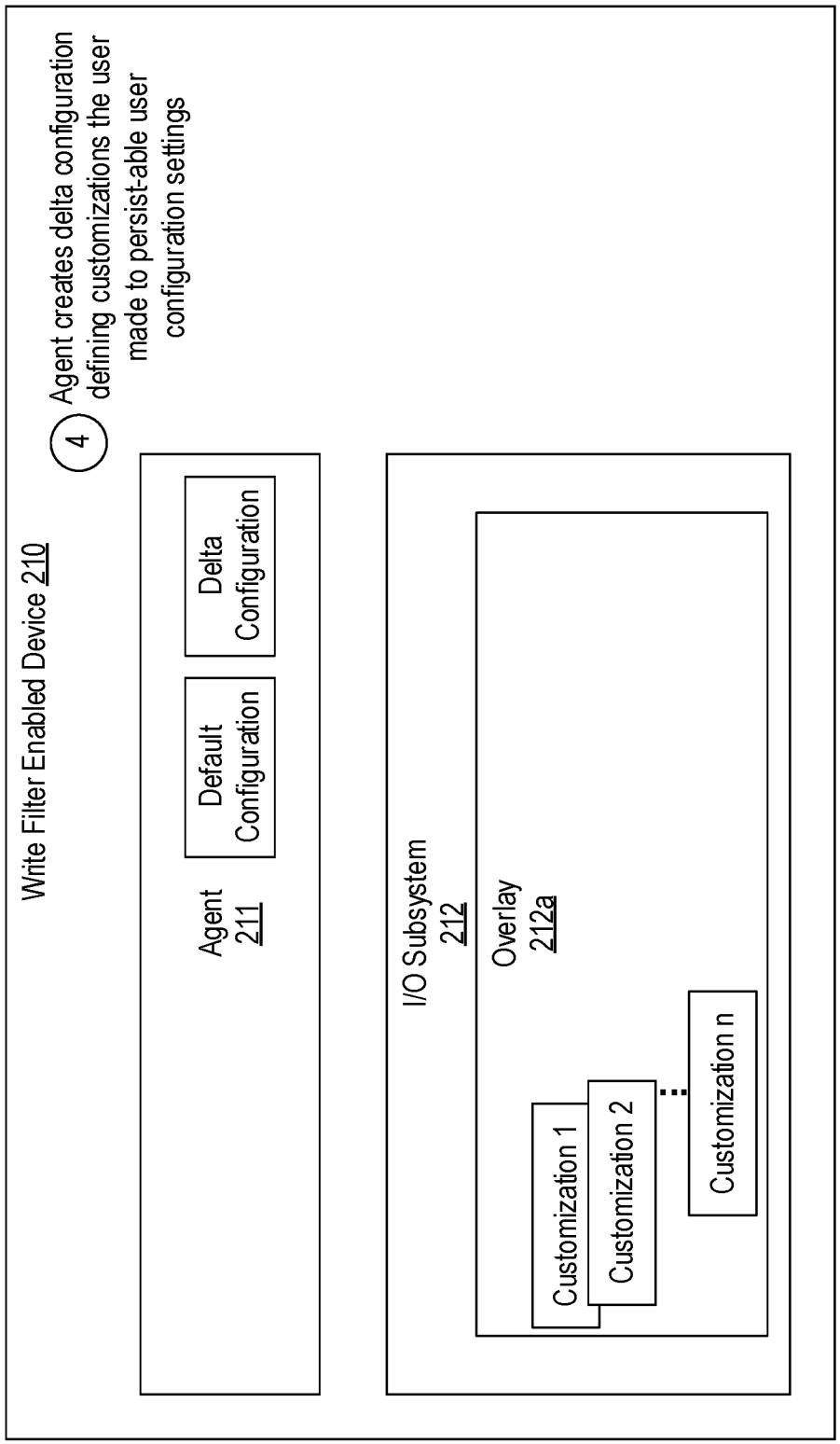

Turning to FIG. 3D, after agent 211 has retrieved the values of any user configuration settings that the user has customized and which the default configuration identifies as being persist-able, agent 211 can create a delta configuration that defines these customizations in step 4. Accordingly, a delta configuration is user-specific and defines customizations that will be persisted so that they can be applied when the user subsequently logs in. In this sense, a delta configuration can be viewed as including entries that specify user-defined values for user configuration settings which may override any predefined values for the same user configuration settings in the default configuration.

The following JSON provides an example of a delta configuration that agent 211 may create:

```
{
 "deltaConfigurations": {
  "configSettings": [
   {
    "configName": "rcShellsettings",
    "configItems": [
    {
        "itemKey": "desktopImageFile",
        "itemValue": "... \image.jpg",
        "valueType": "STRING"
    },
    {
        "itemKey": "customNetwork",
        "itemValue": "SSID1",
        "valueType": "STRING"
    },
    {
        "itemKey": "Mouse",
        "itemValue": "Left",
        "valueType": "STRING"
    }
    ]
   }
  ]
 }
}
```

In this example, it is assumed that, as part of step 2a in FIG. 3B, the user has set a desktop image, connected to a wireless network with an SSID of SSID1 and switched the mouse to left-handed. Because the example default configuration indicates that the user can persist changes to the network and mouse settings (i.e., the urChangeNetwork and urChangeMouse keys have a value of Yes), and because it is assumed that agent 211 always allows the user to change the desktop image, agent 211 will retrieve the customized values for the network, mouse and desktop image user configuration settings. Agent 211 can then create the example delta configuration which defines a desktopImageFile key having a value of " . . . \image.jpg" (which is assumed to be the path to the file the user selected for the desktop image), a customNetwork key having a value of "SSID1" and a Mouse key having a value of "Left." The structure and content of this delta configuration is intended to be a simplified example. In actual implementations, the delta configuration may provide a number of key/value pairs defining the customized values of the user configuration settings. For example, the user may customize many different settings of the mouse and the value of each of these settings may be reflected in the delta configuration so that agent 211 can reapply each of the customizations when the user subsequently logs in.

The format of the delta configuration will also be dependent on how the operating system structures the user configuration settings. For example, if the delta configuration is applicable to Windows-based write filter enabled devices, it may define customizations in the form of registry keys and name/value pairs.

Figure 3E:
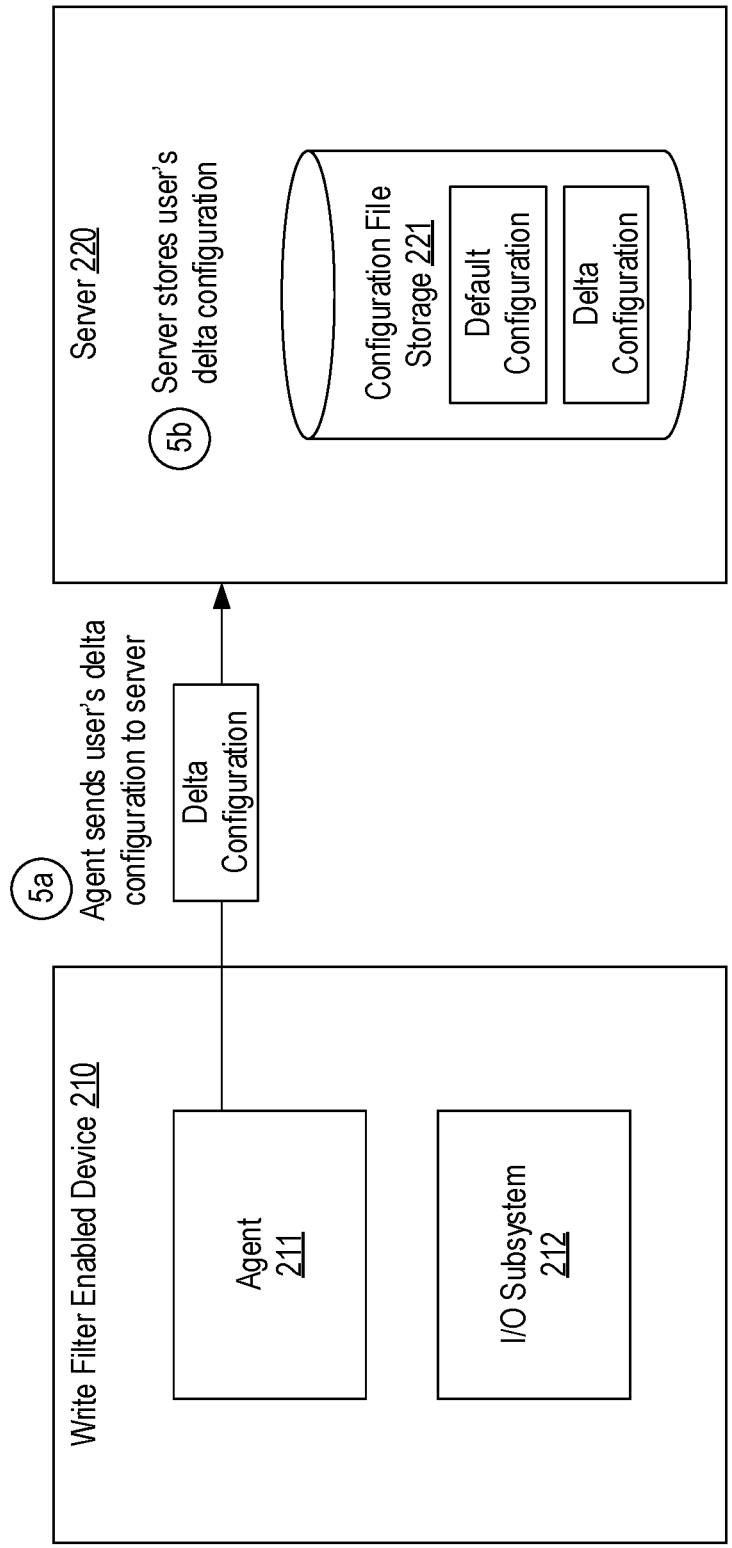

Finally, as shown in FIG. 3E, agent 211 can send the delta configuration to server 220 in step 5a, and in response, server 220 can store the delta configuration in configuration file storage 221 in step 5b. The delta configuration can define or be stored in association with an identifier of the user. As suggested above, agent 211 can perform this process of creating the delta configuration as part of logging off such that any persist-able customizations that the user may have made while logged in will be persisted to server 220.

FIGS. 4A-4F illustrate how agent 211 and server 220 can be configured to function when the user subsequently logs in to any of write filter enabled devices 210. Notably, even if the user logged in to the same write filter enabled device 210, any of the customizations that the user may have made while previously logged in will have been discarded from the write filter enabled device due to the use of the write filter. FIGS. 4A-4F represent how agent 211 and server 220 can enable such customizations to be automatically applied on whatever write filter enabled device 210 the user may subsequently log into.

Figure 4A:
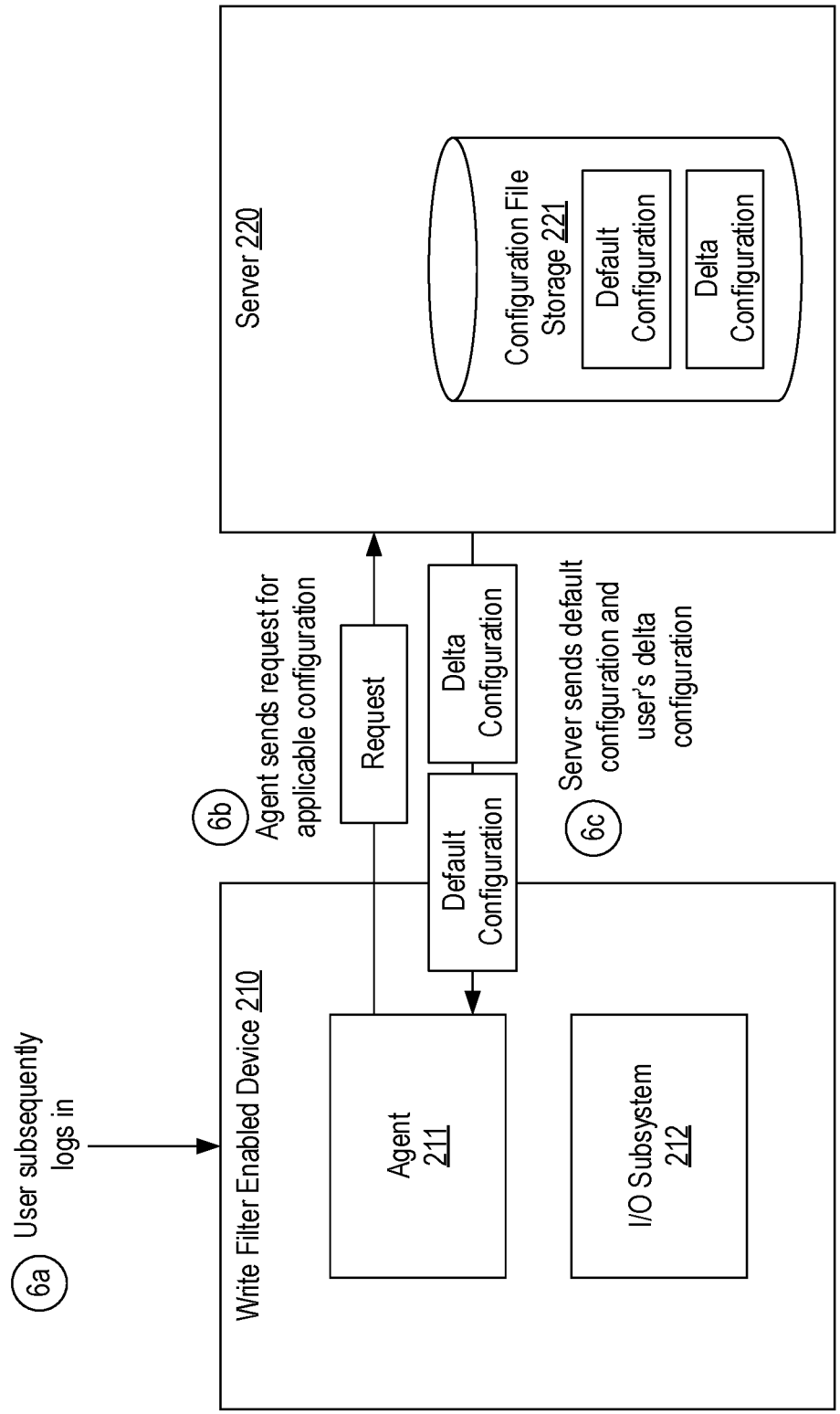
FIG. 4A-4F illustrate a sequence of steps that can be performed when the user subsequently logs in to a write filter enabled device to obtain and apply the delta configuration to thereby cause the user's customizations to the user configuration settings to be automatically applied on the write filter enabled device.

In step 6a shown in FIG. 4A, it is assumed that the user has subsequently logged in to one of the write filter enabled devices 210. In response, agent 211 can request the applicable configuration for this user in step 6b in a similar manner as in step 1b. However, since a delta configuration has been stored for this user, server 220 will respond to the request in step 6c by returning the default configuration as well as the delta configuration that was stored in configuration file storage 221 as part of step 5b.

Figure 4B:
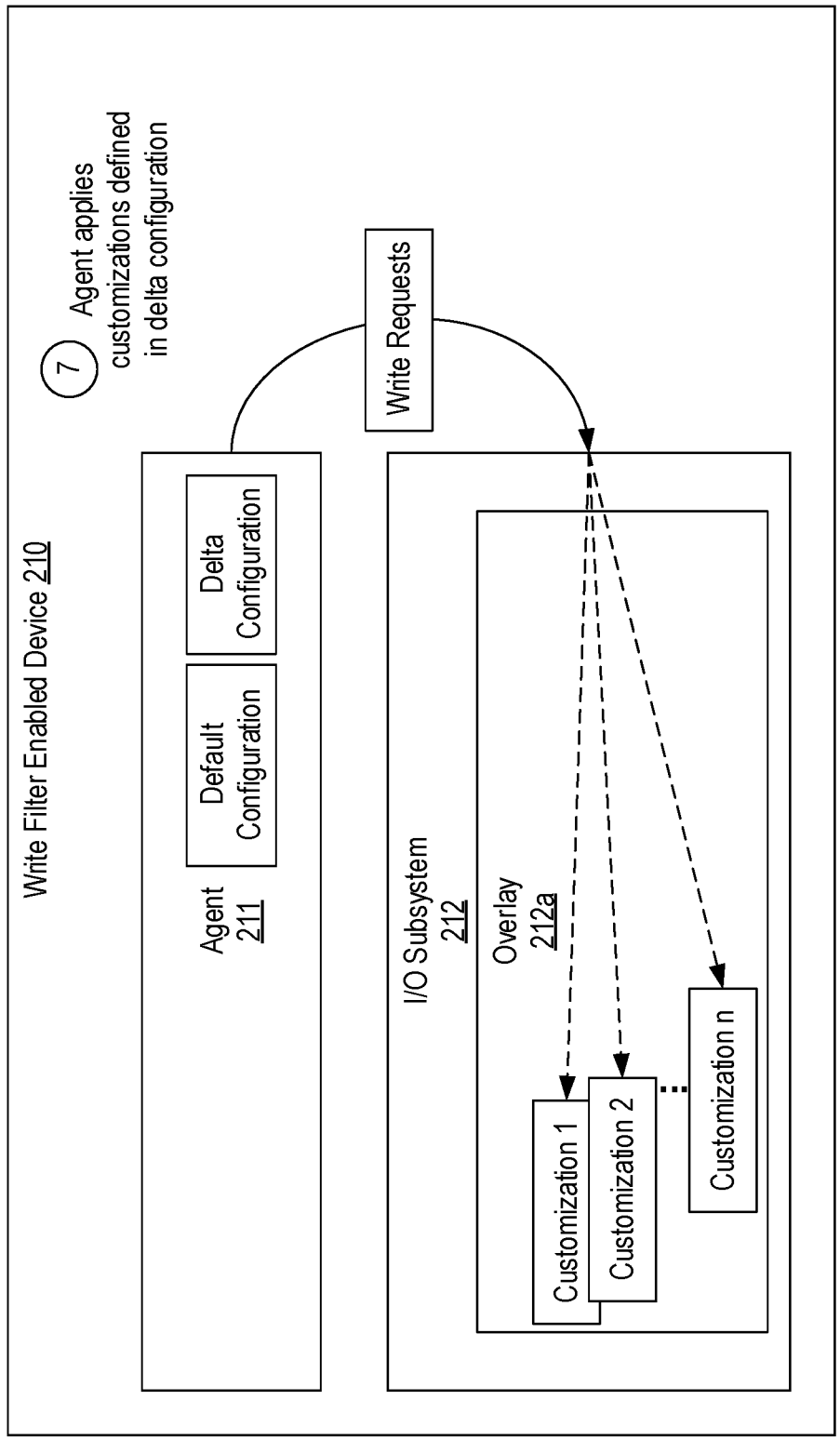

As shown as step 7 in FIG. 4B, in response to receiving the delta configuration, agent 211 can apply the customizations that are defined in the delta configuration. As suggested above, agent 211 can apply these customizations in addition to applying any predefined user configuration settings that are specified in the default configuration. Using the examples above, agent 211 could again cause the kiosk, the admin mode button, the date and time, etc. to be shown/available on the user's desktop, but could prevent the sound icon, the shutdown option, the restart option, etc. from being shown. Additionally, agent 211 could apply the user's customizations to cause the user-selected image to be set as the desktop image, to connect to SSID1 and to set the mouse to left-handed. If any of the customizations in the delta configuration contradict a predefined value in the default configuration, agent 211 can select and apply the customization from the delta configuration.

FIG. 4B represents that agent 211 applies the customizations (as well as any predefined values) by issuing write requests to I/O subsystem 212 which will result in the customizations being stored in overlay 212a. As mentioned above, in a Windows implementation, these customizations could be in the form of modifications to registry entries. For example, to apply the customization to the mouse, agent 211 can issue a write request to change the value of the \HKEY_CURRENT_USER\Control Panel\Mouse\SwapMouseButtons key from 0 (right-handed) to 1 (left-handed). Similarly, to apply the customization to the desktop image, agent 211 can issue a write request to set the value of the HKEY_CURRENT_USER\Control Panel\Desktop\WallPaper key to " . . . \image.jpg." In a Linux environment, these customizations could be in form of modifications to the .conf files where the corresponding user configuration settings are defined.

Figure 4C:
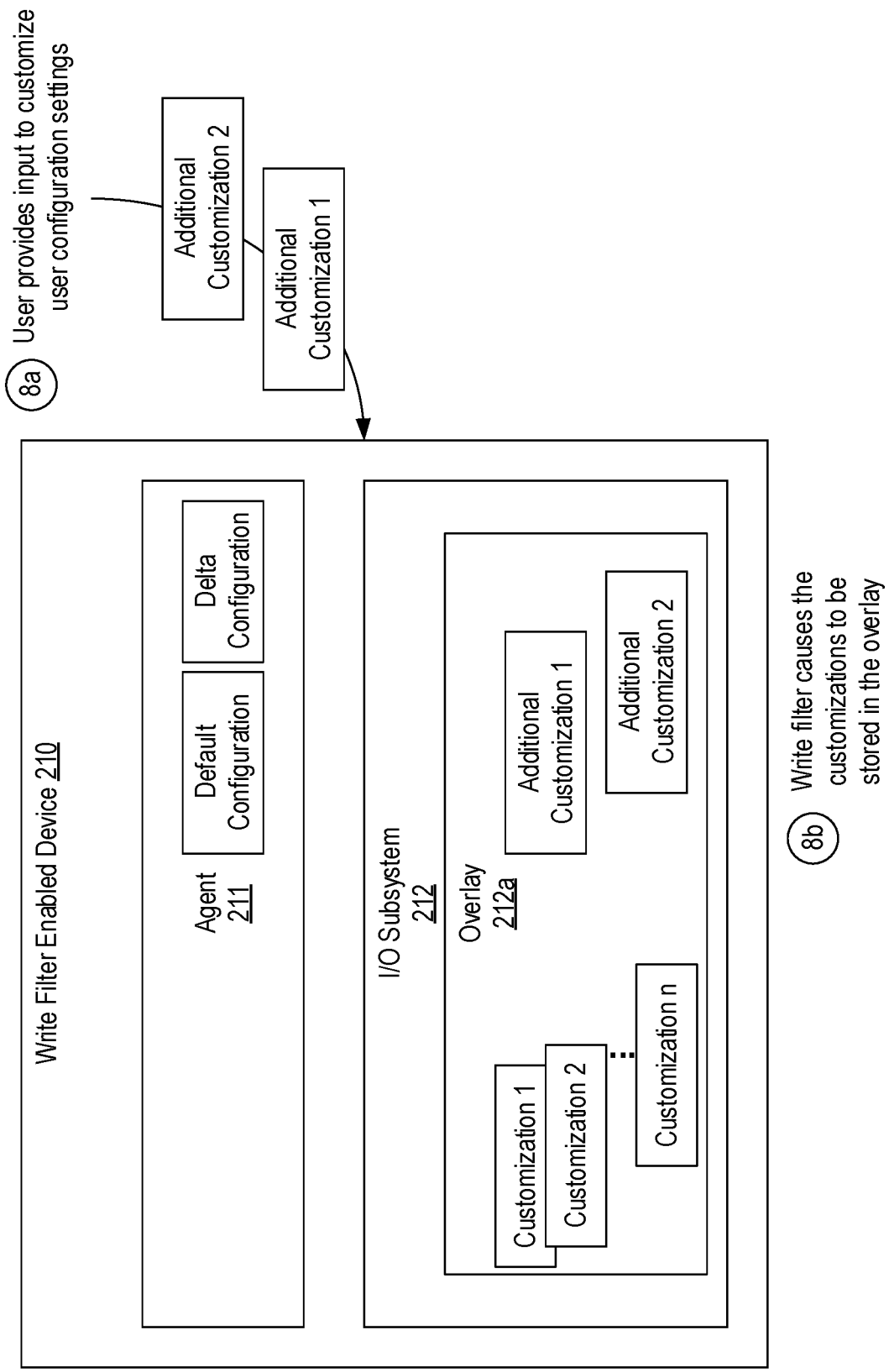

In FIG. 4C, it is assumed that the user provides input in step 8a to customize user configuration settings. In response, the write filter will cause the customizations to be stored in overlay 212a. Accordingly, claims 8a and 8b correspond with steps 2a and 2b. These customizations made in steps 8a and 8b may relate to any user configuration setting including those that were already customized as part of step 7.

Figure 4D:
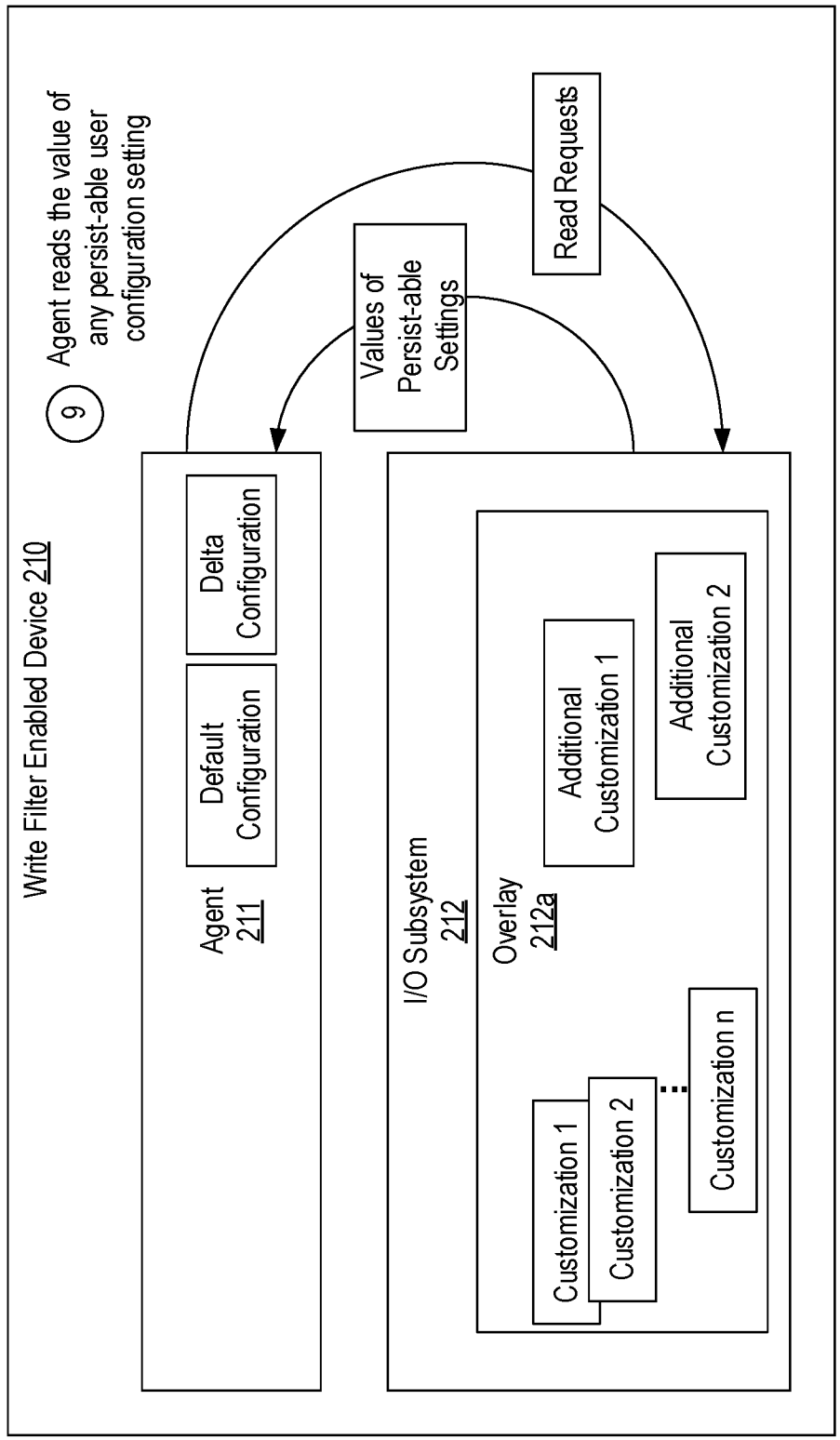

In FIG. 4D, it is assumed that the user has again initiated the logoff process. In response, in step 9 which is similar to step 4, agent 211 can employ the content of the default configuration to retrieve the customizations that were made to any user configuration setting that the default configuration indicates is persist-able. As a result, agent 211 will identify the current value of any persist-able user configuration setting. These current values may define customizations to user configuration settings that the user had not previously customized (i.e., that are not reflected in the current delta configuration), the customizations that agent 211 automatically made as part of step 7 (i.e., customizations that are already reflected in the current delta configuration) or modifications to the customizations that agent 211 automatically made as part of step 7 (i.e., customizations that render obsolete entries in the current delta configuration).

Figure 4E:
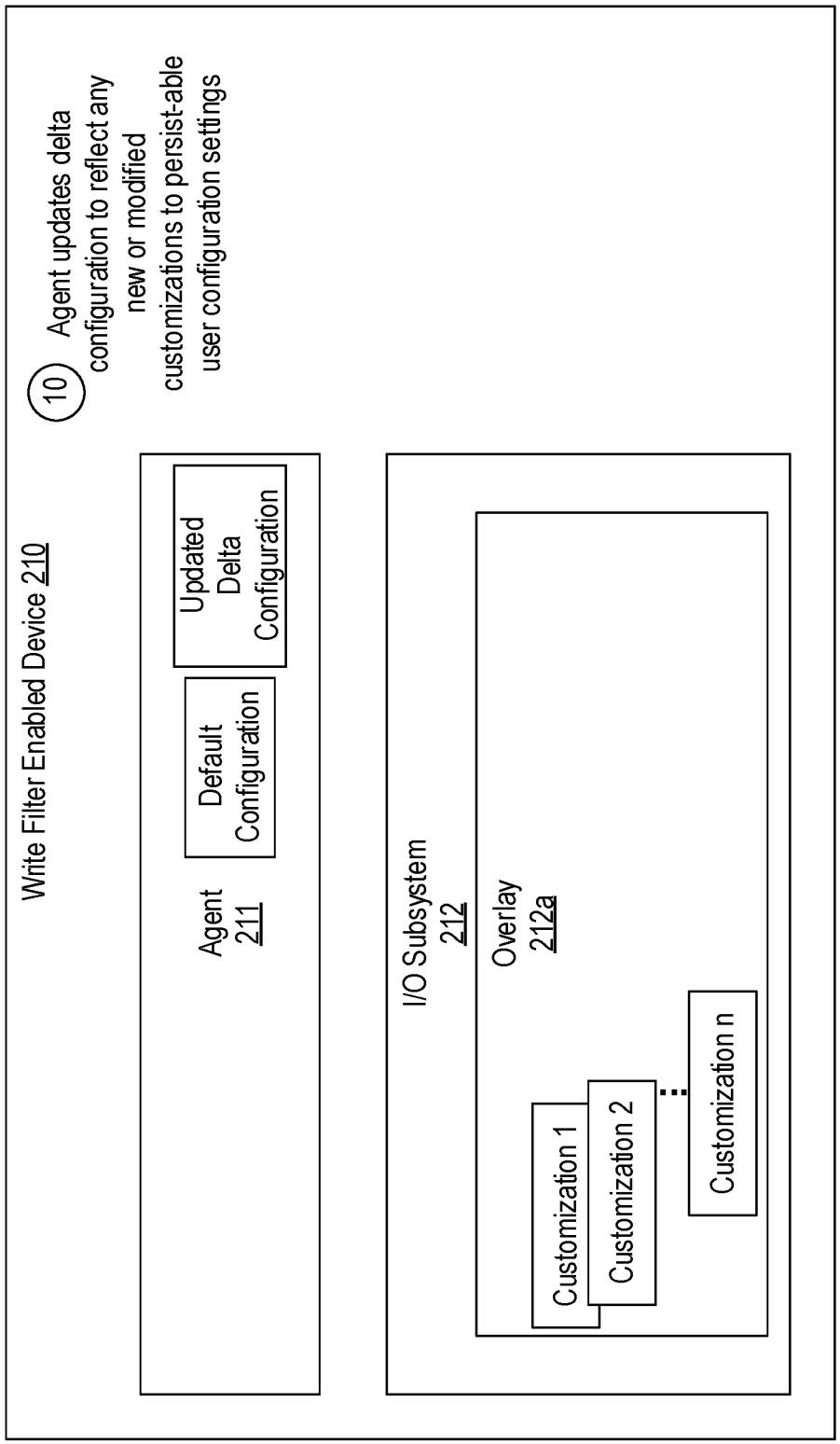
Figure 4F:
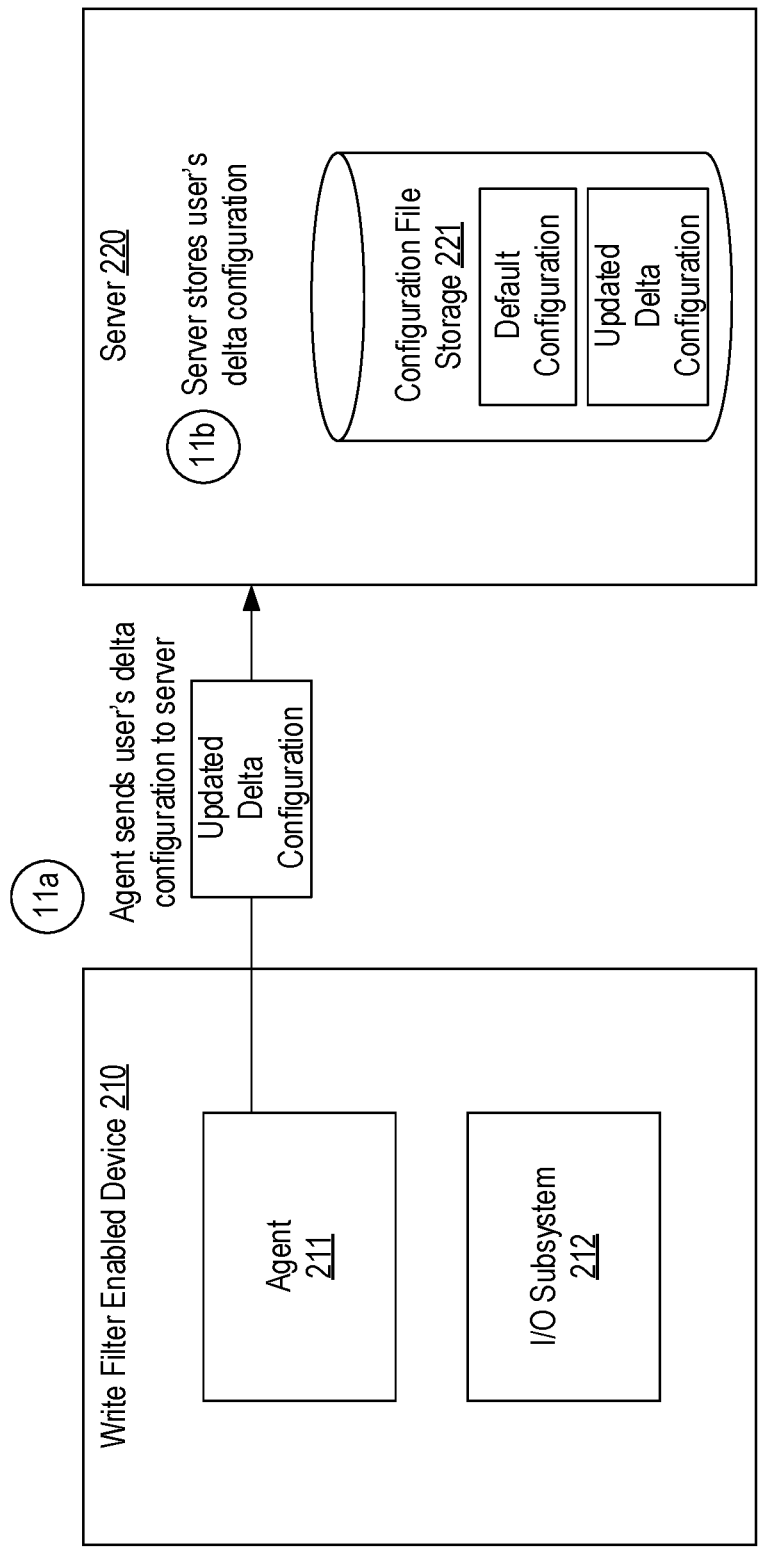

In step 10 shown in FIG. 4E, agent 211 generates an updated delta configuration that reflects the customizations that currently exist to the user configuration settings that are persist-able. Agent 211 could create this updated delta configuration by modifying the existing delta configuration or creating a new delta configuration. In either case, the updated delta configuration will include entries that specify the current user-defined values for persist-able user configuration settings.

As shown in FIG. 4E, agent 211 can then send the updated delta configuration to server 220 in step 11a. In response, server 220 can store the updated delta configuration in configuration file storage 221 in step 11b. The updated delta configuration can overwrite or replace the existing delta configuration so that the most recent delta configuration will be provided to agent 211 when the user subsequently logs in. The process depicted in FIGS. 4A-4E can be repeated each time the user logs in to a write filter enabled device 210. In this way, the user-defined customizations will "follow" the user to any write filter enabled deice 210 that he or she may use.

Because delta configurations are stored centrally in configuration file storage 221, an administrator can quickly and easily review, change and even delete any user-defined customizations. For example, if the administrator determines that customizations to certain network settings should no longer be allowed (e.g., if a particular wireless network is no longer being provided or is vulnerable), the administrator can employ server 220 to query and delete such network settings that may be defined in any delta configuration. Similarly, if a particular user customized a user configuration setting unintentionally or does not know how to customize a user configuration setting, the administrator can make changes directly to the user's delta configuration stored in configuration file storage 221 to thereby set the user configuration setting to the desired value. The administrator may even delete the entire delta configuration for a particular user (e.g., when the user leaves the company). This centralized management may be particularly helpful in environments where the end user is remote from the administrator.

The use of default and delta configurations can also greatly simplify the implementation of an open seating environment by allowing the administrator to limit the number of configuration settings that a user will be able to customize and persist. In particular, the administrator can use the first type of entries in the default configuration to minimize the number of user configuration settings that the user will be able to see/control and can use the second type of entries to define a limited set of user configuration settings that can be persisted. Considering that there may be thousands of user configuration settings, the present invention can greatly reduce the load that the write filter would otherwise experience if the user were allowed to control and persist all user configuration settings.

FIG. 5 provides a flowchart of an example method 500 for persisting user configuration settings on write filter enabled devices. Method 500 can be implemented by agent 211 which executes on a write filter enabled device 210.

Method 500 includes an act 501 of, in conjunction with a user logging in to a first write filter enabled device, receiving a default configuration that identifies one or more user configuration settings available on the first write filter enabled device. For example, agent 211 can request the default configuration that is applicable to a user that logs in to a write filter enabled device 210.

Method 500 includes an act 502 of determining that the user has customized at least one of the one or more user configuration settings. For example, agent 211 can query I/O subsystem 212 to retrieve values of any configuration setting that is defined as persist-able in the default configuration.

Method 500 includes an act 503 of creating a delta configuration that identifies each customized user configuration setting. For example, agent 211 can create a delta configuration that reflects the user's customizations to any persist-able user configuration settings.

Method 500 includes an act 504 of sending the delta configuration to a server. For example, agent 211 can send the delta configuration to server 220 for storage in configuration file storage 221.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for persisting user configuration settings on write filter enabled devices, the method comprising:

in conjunction with a user logging in to a first write filter enabled device, receiving, by an agent executing on the first write filter enabled device, a default configuration that identifies user configuration settings available on the first write filter enabled device;

determining that the user configuration settings identified in the default configuration include persist-able user configuration settings;

determining, by the agent, that the user has customized at least one of the persist-able user configuration settings while the user is logged in to the first write filter enabled device by accessing an overlay of an I/O subsystem on the first write filter enabled device to read a value that the user defined for each of the at least one of the persist-able user configuration settings;

creating, by the agent, a delta configuration that identifies each of the at least one of the persist-able user configuration settings and the value that the user defined for each of the at least one of the persist-able user configuration settings; and sending, by the agent, the delta configuration to a server to thereby enable the delta configuration to be applied when the user subsequently logs in to the first write filter enabled device or another write filter enabled device.

2. The method of claim 1, wherein the agent determines that the user has customized at least one of the persist-able user configuration settings as part of a logoff process.

3. The method of claim 1, wherein the user configuration settings identified in the default configuration also include non-persist-able user configuration settings.

4. The method of claim 1, wherein the persist-able user configuration settings that are identified in the default configuration comprise one or more of:
   a setting pertaining to a geographical region;
   a setting pertaining to a data and time;
   a setting pertaining to a display;
   a setting pertaining to a network;
   a setting pertaining to a mouse;
   a setting pertaining to a keyboard;
   a setting pertaining to sound; or
   a setting pertaining to ease of access.

5. The method of claim 1, wherein the agent receives the default configuration from the server.

6. The method of claim 1, further comprising:
   in conjunction with the user logging in to a second write filter enabled device, receiving, by an agent executing on the second write filter enabled device, the delta configuration;
   obtaining, from the delta configuration, the value that the user defined for each of the at least one of the persist-able user configuration settings; and
   applying the value that the user defined for each of the at least one of the persist-able user configuration settings to the second write filter enabled device.

7. The method of claim 6, wherein the first write filter enabled device and the second write filter enabled device are not the same write filter enabled device.

8. The method of claim 6, further comprising:
   receiving, by the agent executing on the second write filter enabled device, the default configuration in addition to the delta configuration;
   determining, by the agent executing on the second write filter enabled device, that the user has customized at least one of the persist-able user configuration settings while the user is logged in to the second write filter enabled device by accessing an overlay of an I/O subsystem on the second write filter enabled device to read a value that the user defined for each of the at least one of the persist-able user configuration settings that the user has customized while the user is logged in to the second write filter enabled device;
   creating, by the agent executing on the second write filter enabled device, an updated delta configuration that identifies each of the at least one of the persist-able user configuration settings that the user has customized while the user is logged in to the second write filter enabled device and the value that the user defined for each of the at least one of the persist-able user configuration settings that the user has been customized while the user is logged in to the second write filter enabled device; and
   sending, by the agent, the updated delta configuration to the server.

9. The method of claim 8, wherein the at least one of the persist-able user configuration settings that the user has customized while the user is logged in to the second write filter enabled device includes at least one of the persist-able user configuration settings that is identified in the delta configuration.

10. The method of claim 8, wherein the at least one of the persist-able user configuration settings that the user has customized while the user is logged in to the second write filter enabled device includes at least one of the persist-able user configuration settings that is not identified in the delta configuration.

11. The method of claim 1, wherein the default configuration also specifies a predefined value for one or more other user configuration settings available on the first write filter enabled device, the method further comprising:
   applying, by the agent, the predefined value to each of the one or more other user configuration settings.

12. One or more computer storage media storing computer executable instruction which when executed by one or more processors on a write filter enabled device implement an agent that is configured to perform a method for persisting user configuration settings, the method comprising:
   accessing, by a first stance of the agent that is executing on a first write filter enabled device of a plurality of write filter enabled devices, a default configuration that identifies persist-able user configuration settings that are available on each of the plurality of write filter enabled devices;
   for each of at least one of the persist-able user configuration settings, retrieving, by the first instance of the agent and from an overlay of an I/O subsystem on the first write filter enabled device, a value that a user has defined for the persist-able user configuration setting while the user is logged in to the first write filter enabled device;
   creating, by the first instance of the agent, a delta configuration that identifies each of the at least one persist-able user configuration settings and the corresponding value that the user has defined for the persist-able user configuration setting;
   sending, by the first instance of the agent, the delta configuration to a server to thereby cause the delta configuration to be stored and made accessible when the user subsequently logs in to any one of the plurality of write filter enabled devices;
   accessing, by a second instance of the agent that is executing on a second write filter enabled device of the plurality of write filter enabled devices, the delta configuration when the user subsequently logs in to the second write filter enabled device, and
   applying, by the second instance of the agent, the delta configuration on the second write filter enabled device.

13. The computer storage media of claim 12, wherein the method further comprises:
   retrieving the delta configuration when the user subsequently logs in to any one of the plurality of write filter enabled devices; and
   for each persist-able user configuration setting identified in the delta configuration, applying the corresponding value to customize the write filter enabled device to which the user is logged in.

14. The computer storage media of claim 12, wherein the delta configuration is created in response to the user initiating a logoff process.

15. The computer storage media of claim 12, wherein the default configuration also identifies one or more other user configuration settings and specifies a predefined value for each of the one or more other user configuration settings, the method further comprising:

applying the predefined value for each of the one or more other user configuration settings to customize the write filter enabled device to which the user is logged in.

16. The computer storage media of claim 12, wherein the persist-able user configuration settings that are available on each of the plurality of write filter enabled devices comprise one or more of:
   a setting pertaining to a geographical region;
   a setting pertaining to a data and time;
   a setting pertaining to a display;
   a setting pertaining to a network;
   a setting pertaining to a mouse;
   a setting pertaining to a keyboard;
   a setting pertaining to sound; or
   a setting pertaining to ease of access.

17. A method for persisting user configuration settings on write filter enabled devices, the method comprising:
   in conjunction with a user logging in to a first write filter enabled device, receiving, by an agent executing on the first write filter enabled device, a default configuration that identifies persist-able user configuration settings that are available on the first write filter enabled device;
   in conjunction with the user logging off from the first write filter enabled device, accessing, by the agent executing on the first write filter enabled device, an overlay of an I/O subsystem on the first write filter enabled device to retrieve a custom value that the user defined for at least one of the persist-able user configuration settings while the user was logged in to the first write filter enabled device;
   creating, by the agent executing on the first write filter enabled device, a delta configuration that identifies the custom value that the user defined for the at least one of the persist-able user configuration settings while the user was logged in to the first write filter enabled device;
   sending, by the agent executing on the first write filter enabled device, the delta configuration to a server;
   in conjunction with the user subsequently logging in to a second write filter enabled device, receiving, by an agent executing on the second write filter enabled device, the delta configuration; and
   applying, by the agent executing on the second write filter enabled device, each custom value identified in the delta configuration to customize the second write filter enabled device.

18. The method of claim 17, wherein the agent executing on the second write filter enabled device receives the default configuration in addition to the delta configuration, the method further comprising:
   in conjunction with the user logging off from the second write filter enabled device, creating, by the agent executing on the second write filter enabled device, an updated delta configuration that identifies a custom value that was defined for at least one of the persist-able user configuration settings while the user was logged in to the second write filter enabled device; and
   sending, by the agent executing on the second write filter enabled device, the updated delta configuration to a server.

19. The method of claim 18, wherein the updated delta configuration identifies:
   a custom value that the user defined for at least one of the persist-able user configuration setting while the user was logged in to the first write filter enabled device; and
   a custom value that the user defined for at least one of the persist-able user configuration setting while the user was logged in to the second write filter enabled device.

20. The method of claim 17, wherein the persist-able user configuration settings that are available on each of the plurality of write filter enabled devices comprise one or more of:
   a setting pertaining to a geographical region;
   a setting pertaining to a data and time;
   a setting pertaining to a display;
   a setting pertaining to a network;
   a setting pertaining to a mouse;
   a setting pertaining to a keyboard;
   a setting pertaining to sound; or
   a setting pertaining to ease of access.

* * * * *